United States Patent
Vera Villares et al.

(10) Patent No.: US 8,783,618 B2
(45) Date of Patent: Jul. 22, 2014

(54) WEATHERTIGHT FITTING FOR AIRCRAFT TAIL VERTICAL STABILISER MOUNTING

(75) Inventors: Enrique Vera Villares, Madrid (ES); Elena Arévalo Rödríguez, Madrid (ES); José Maria Pina López, Madrid (ES); Javier Cabeza Huertas, Segovia (ES); Diego Folch Cortés, Madrid (ES)

(73) Assignee: Airbus Operations S.L., Madrid (ES)

( * ) Notice: Subject to any disclaimer, the term of this patent is extended or adjusted under 35 U.S.C. 154(b) by 409 days.

(21) Appl. No.: 13/136,013

(22) Filed: Jul. 20, 2011

(65) Prior Publication Data

US 2012/0091275 A1    Apr. 19, 2012

(30) Foreign Application Priority Data

Oct. 19, 2010   (ES) .................................. 201031538

(51) Int. Cl.
*B64C 1/26*        (2006.01)
(52) U.S. Cl.
USPC ................................ 244/131; 244/91; 244/87
(58) Field of Classification Search
CPC .......... B64C 1/069; B64C 1/068; B64C 1/06; B64C 1/12
USPC .............. 244/131, 87, 91; 52/715, 712, 655.1
See application file for complete search history.

(56) References Cited

U.S. PATENT DOCUMENTS

| 8,408,495 B2 | 4/2013 | Cortes et al. |
| 2010/0127127 A1 | 5/2010 | Manzano |
| 2010/0155532 A1 | 6/2010 | Ariza Martin et al. |

FOREIGN PATENT DOCUMENTS

| ES | 2293809 | 3/2008 |
| RU | 1683269 | 2/1995 |
| WO | WO 2010/122200 A2 | 10/2010 |

*Primary Examiner* — Rob Swiatek
*Assistant Examiner* — Timothy Schwarz
(74) *Attorney, Agent, or Firm* — Paul Bogdon

(57) ABSTRACT

Weathertight fitting (41) for the mounting of the tail vertical stabilizer of an aircraft in a rear area of its fuselage, the construction being based on a casing (5) made with a composite material as one unitary piece and some frames (7) that are comprised of: one first piece (43) comprised of two bodies (45, 45'), that include the mounting lugs (47, 47') for the tail vertical stabilizer and some vertical walls (49, 49') for joining the fitting (43) to the frames (7) of the fuselage, and a weathertight central profile (51); two pairs of additional pieces (55, 55'; 65, 65') of angular shape, that include some horizontal walls (57, 57'; 67, 67') for joining to the casing (5) and some vertical walls (59, 59'; 69, 69') for joining to the aforementioned bodies (45, 45'). All the weathertight fitting's (41) pieces are made with a composite material.

6 Claims, 3 Drawing Sheets

US 8,783,618 B2

WEATHERTIGHT FITTING FOR AIRCRAFT TAIL VERTICAL STABILISER MOUNTING

INVENTION FIELD

This invention is a weathertight fitting for an aircraft's tail vertical stabiliser mounting; more specifically, a weathertight fitting made from composite material.

BACKGROUND OF THE INVENTION

Despite the trend in recent years for increased use of composite materials, such as CFRP (Carbon Fibre Reinforced Plastic), in the greatest possible number of aircraft components due to the weight savings such materials offer in comparison to aluminium (the preferred metallic material for use in aircraft), the majority of aircraft manufacturers are reluctant to use carbon fibre in the manufacture of fittings. This is because their complexity makes production quite expensive.

This particularly applies to fittings used for the mounting of tail vertical stabilisers. These continue to be made with metallic materials.

Along with their greater weight, the use of metallic fittings for mounting parts made with composite materials in aircraft fuselage areas that are also made with composite materials presents various problems, particularly those related to reduction of the effective casing area as well as assembly difficulties.

Manufacture of composite material fittings with shapes similar to those of metallic fittings is possible but, apart from the cost incurred due to the complexity of shape, there arises, among other problems, the fact that it is very difficult, using such a shape, for the structure of laminars to be an optimised structure for attaining the required load distribution.

In the not yet published Spanish application no. 200901039, from the same applicant as the invention presented here, there is a description of composite material fittings designed to solve these difficulties. However, the described fittings are not applicable to pressurised areas of the aircraft.

This invention is aimed at solving that problem.

SUMMARY OF THE INVENTION

An aim of this invention is to provide weathertight fittings that are wholly made from composite material, for the mounting of the tail vertical stabiliser in the rear fuselage area of an aircraft, built using composite casing material, and that is comprised of one unitary section and some frames that are likewise made with a composite material.

Another aim of this invention is to provide weathertight fittings for the mounting of the tail vertical stabiliser in the rear fuselage area of an aircraft that are easily mounted.

As a primary feature, these and other aims are achieved by a fitting that comprises:

a) a first part, made with a composite material, that is comprised of two pieces that include the mounting lugs for the tail vertical stabiliser and some vertical walls joining to the fuselage frames, and a central leaktight profile;

b) two pairs of additional pieces of angular shape, made with a composite material, that include some horizontal walls that join to the casing—by their internal and external facing and some vertical joining walls—in areas located beneath and on top of the casing.

In a preferred embodiment, the lugs of the first piece and the vertical walls of the second pairs of additional pieces, have drilled holes designed to be aligned for receiving the bolt joining the tail vertical stabiliser. This provides a fitting that is structured to facilitate mounting.

In another preferred embodiment, the aforementioned central profile is aligned with the horizontal walls of the first pair of additional pieces. This provides a structured fitting with the leaktight element in an optimal position for performing its function.

In another preferred embodiment, all the fitting's pieces are made with CFRP. This provides a fitting made with a composite material that is appropriate for bearing important stresses.

As a secondary feature, those and other aims are achieved via a fitting mounting procedure that is comprised of the following steps:

a) mounting the first piece by the internal part of the casing;

b) mounting the first pair of additional pieces, joining their horizontal walls to the casing by means of a mechanical joint and joining their vertical walls to the bodies of the first piece by means of a mechanical joint or a chemical bond;

c) mounting the second pair of additional pieces, joining their horizontal walls to the casing by means of a mechanical joint and joining their vertical walls to the bodies of the first piece by means of a chemical bond or by installing o bushings in the drilled holes in both elements for the reception of the bolt that joins the vertical stabiliser.

This provides a very simple mounting procedure that does not require additional tasks for final mounting.

Other features and advantages of this invention will be provided in the following detailed description that illustrates its objective, along with accompanying diagrams.

DESCRIPTION OF DIAGRAMS

DETAILED DESCRIPTION OF THE INVENTION

Figure 1:
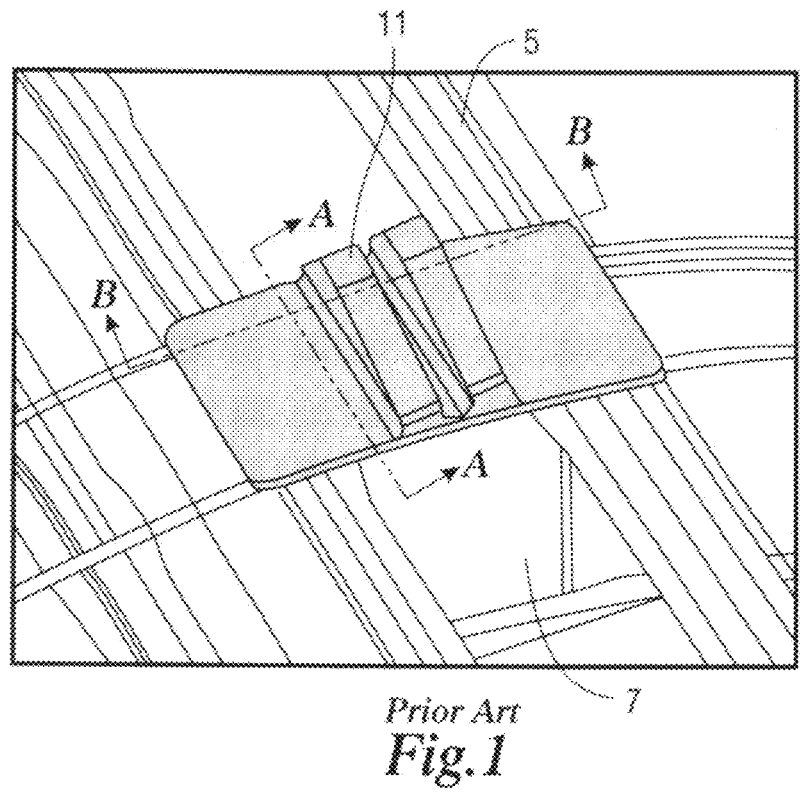
FIG. 1 is a perspective view of a fitting for a tail vertical stabiliser mounting, mounted on the rear fuselage of an aircraft, illustrating technique.
Figure 2:
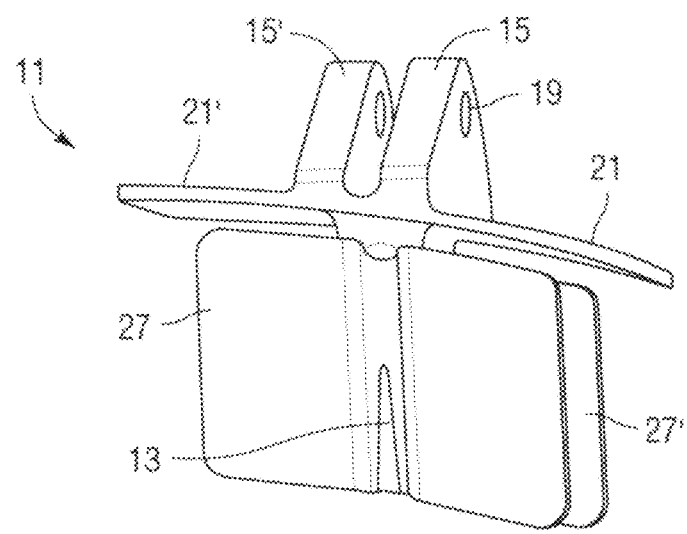
FIG. 2 is a perspective view of the fitting from FIG. 1.

For a better understanding of the invention we will first describe a fitting for a tail vertical stabiliser mounting, with technical reference to FIGS. 1-3.

Figure 3A:
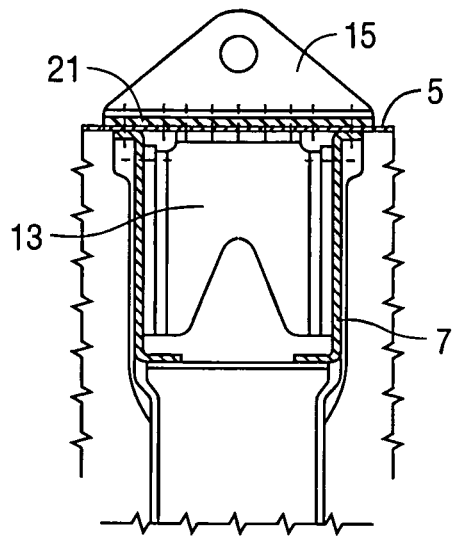
FIGS. 3a and 3b are, respectively, transverse sections of FIG. 1 along axes A-A and B-B.
Figure 3B:
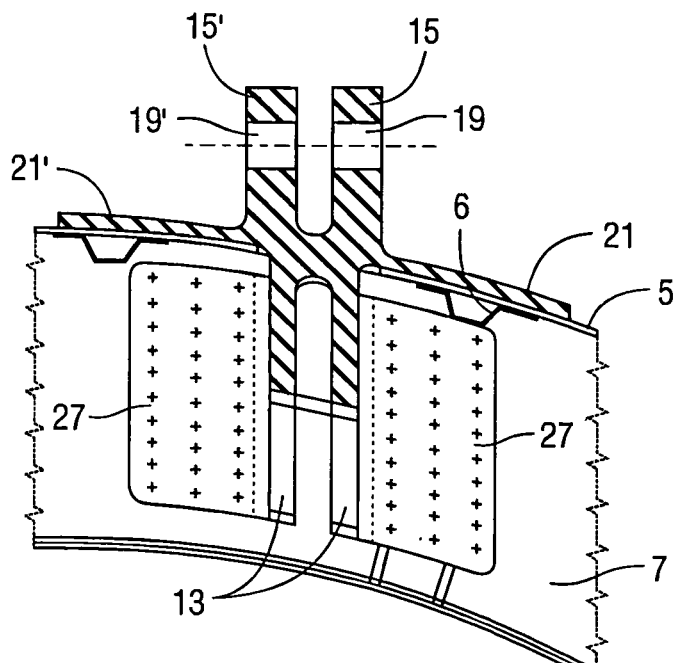

It is a fitting 11 of one piece with some frames 15, 15' to receive the load element from the vertical stabiliser, a pair of horizontal walls 21, 21' that join to the casing 5 and a pair of vertical walls 27, 27' (continuous or segmented into two parts as shown in FIG. 2, depending on the location of the fitting) that join to the frames 7 of the fuselage. In FIGS. 3a and 3b one can see the corresponding joins in detail.

As an expert in the matter of the terms "horizontal" and "vertical" will well understand, these should not be understood in a rigorously strict geometrical sense, but rather as mere identifying terms for the fitting's components. Also, the central body shape 13 of the fitting 11 may vary from one fitting to another, depending on its location.

As we have pointed out, the basic problem with a metallic fitting with a shape shown as 11, apart from its weight, is determined by the constraints of its mounting. Being a single mechanical piece, the mounting fit must be in contact with the casing 5 and the drilled holes 19, 19' of the frames 15, 15' and they must be reworked in situ to ensure that its axis is located in the correct position, thus requiring an in situ install of the bushings that must be mounted in the holes in order to operate with the joining bolt for the tail vertical stabiliser element, with the frames 15, 15' between which it is placed.

This type of problem would arise in the case of a composite material fitting that is of a similar shape and, additionally, there would be difficulty in optimising the laminars, since the constraints of load distribution would necessitate a high degree of thickness in some components, particularly the frames 15, 15' as is suggested by FIG. 2 itself.

With regard to that state of technology, the basic idea of this invention is to configure the fitting in two or more parts, which will facilitate its mounting and the optimisation of the laminars of its different components.

Figure 4:
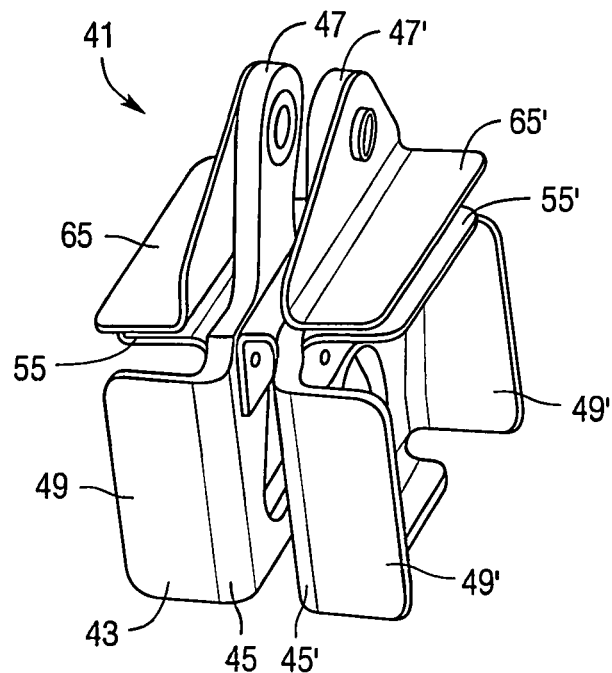
FIG. 4 is a perspective view of a fitting for a tail vertical stabiliser mounting, of vertical load for this invention.
Figure 5:
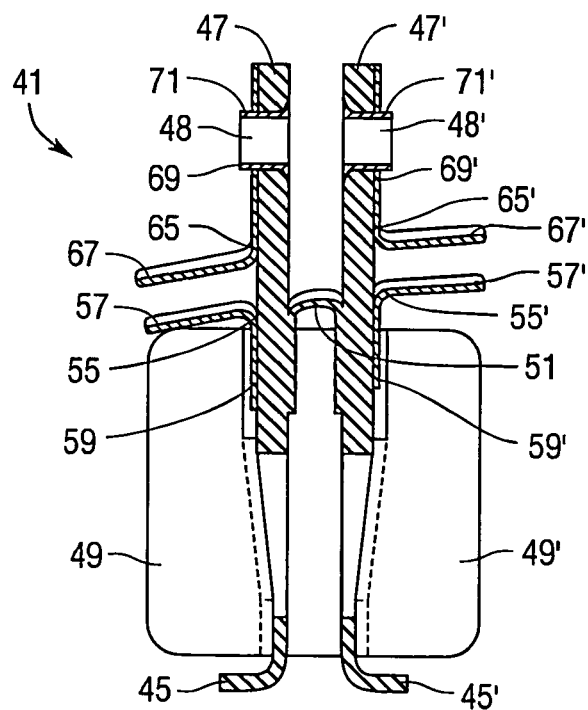
FIG. 5 is a transverse section view of the fitting from FIG. 4.

In a preferred embodiment of this invention, the weathertight fitting 41, illustrated in FIGS. 4-5, is made up of five pieces, all of them made with composite material:

A first piece 43 with two bodies 45, 45', each of them respectively including, the lugs 47, 47' of the tail vertical stabiliser mounting and the vertical walls 49, 49' for joining to the frames 7 of the fuselage and a central profile 51 designed to make the fitting weathertight, which should be underneath the casing 5. The unitary form of the piece 43 facilitates, as we will see later, mounting of the fitting 41. In turn, the central profile 51 has the additional function of serving as a means of union of the bodies 45, 45' which enables optimisation of the vertical walls 49, 49' of union to the fuselage frames.

A first pair of pieces 55, 55' of angular shape designed so that their horizontal walls 57, 57' join to the fuselage casing 5 by its internal part, and their vertical walls 59, 59' are joined to the bodies 45, 45' of the first piece 43.

A second pair of additional pieces 65, 65' of angular shape designed so that their horizontal walls 67, 67' join to the fuselage casing 5 by its external facing and in order that their vertical walls 69, 69' are joined to the bodies 45, 45' of the first piece 43 in the area of the lugs 47, 47'.

The five pieces 43, 45, 45', 55, 55' are made using conventional techniques, and from composite materials, particularly CFRP.

The first piece 43 of the fitting 41 is mounted by the interior part of the casing 5 and for this reason the drilled holes 48, 48' of the lugs 47, 47' are located in their definitive positions, and do not need to be reworked.

The pieces 55, 55' of the first pair join to the bodies 45, 45' of the piece 43 in the final mounting line, ensuring its correct positioning, preferably by mechanical means and in particular by using rivets, although in the case of the vertical walls 59, 59' these can also be joined using chemical means, particularly adhesives. The final gap between the horizontal walls 57, 57' and the fuselage casing 5 can be covered with a sheet with appropriate filling.

In turn, the pieces 65, 65' of the second pair are mounted on the external part of the casing 5 in the final mounting line as this will ensure its correct positioning. The vertical walls 69, 69' join to the bodies 45, 45' by means of adhesives or simply by means of the bushings 71, 71' that are placed into the drilled holes 48, 48' of both pieces, and the horizontal walls 67, 67' join to the casing 5 by means of rivets. The final gap between the horizontal walls 67, 67' and the fuselage casing 5 can be covered with a sheet with appropriate filling.

Being made entirely with a composite material, preferably CFRP, the fitting has no corrosion problems as do metallic fittings. Also, division of the fitting 41 into pieces 43, 55, 55', 65, 65' enables optimisation of the respective laminars based on the loads to be borne by each one. In this respect one can appreciate the complementary function provided by the vertical walls 69, 69' of the second pair of pieces 65, 65' to the bodies 45, 45' in the area of the lugs 47, 47' to bear the load of the vertical stabiliser. With regard to this, one can see the substantial differences in shape between the vertical walls 69, 69' and the lugs 47, 47'.

Piece 43 is preferably made by separately preparing the bodies 45, 45' and the profile 51 in a first stage, and joining the two together in a second stage, using an appropriate technique.

To the products that have just been described can be added those modifications contained within the scope defined by the following claims.

The invention claimed is:

1. A weathertight fitting (41) for mounting a tail vertical stabiliser in the rear fuselage area of an aircraft that is built using composite casing (5) material and that is comprised of a unitary section and frames (7) that are made with a composite material, characterised as comprising:
    a) a first piece (43) made with a composite material and comprised of at least two bodies (45, 45') and a central profile (51) for joining the at least two bodies (45, 45') together, each of the two bodies (45, 45') including a mounting lug (47, 47') for mounting the tail vertical stabiliser to the fuselage and a vertical wall (49, 49') for joining the first part (43) to the frames (7) of the fuselage;
    b) a first pair of pieces (55, 55') of angular shape made with a composite material and having a horizontal wall (57, 57') and a vertical wall (59, 59'), each of the pieces (55, 55') of the first pair being joined to one of the two bodies (45, 45') of the first piece (43) and the horizontal wall (57, 57') of each of the pieces (55, 55') being structured to be positioned relative to the casing (5); and
    c) a second pair of pieces (65, 65') of angular shape made with a composite material and having a horizontal wall (67, 67') and a vertical wall (69, 69'), each of the pieces (65, 65') of the second pair being joined to one of the two bodies (45, 45') of the first piece (43) and the horizontal wall (67, 67') of each of the pieces (65, 65') being structured to be positioned relative to the casing (5).

2. The weathertight fitting (41) of claim 1, wherein the mounting lug (47, 47') of each of the two bodies (45, 45') of the first piece (43) and the vertical wall (69, 69') of each of the pieces (65, 65') of the second pair have a drilled hole (48, 48') designed to be aligned for receiving a bolt for joining the tail vertical stabiliser to the aircraft.

3. The weathertight fitting (41) of claim 2, wherein the central profile (51) of the first piece (43) is aligned with the horizontal wall (57, 57') of each of the first pair of pieces (55, 55').

4. The weathertight fitting (41) of claim 3, wherein the composite material of the first piece (43), the first pair of pieces (55, 55), and the second pair of pieces (65, 65') comprises carbon fibre reinforced plastic material.

5. A process for mounting the weathertight fitting (41) of claim 4, to the fuselage of the aircraft, comprising:
    a) mounting the first piece (43) to an interior part of the casing (5);
    b) mounting each of the pieces (55, 55') of the first pair by joining the horizontal wall (57, 57') to the casing (5) by means of a mechanical joint and joining the vertical wall (59, 59') to one of the two bodies (45, 45') of the first piece (43) by means of a mechanical joint; and
    c) mounting each of the pieces (65, 65') of the second pair by joining the horizontal wall (67, 67') to the casing (5) by means of a mechanical joint and joining the vertical wall (69, 69') to one of the two bodies (45, 45') of the first piece (43) by means of a chemical bond.

6. A process for mounting the weathertight fitting (41) of claim 4, to the fuselage of the aircraft, comprising:
 a) mounting the first piece (43) to an interior part of the casing (5);
 b) mounting each of the pieces (55, 55') of the first pair by joining the horizontal wall (57, 57') to the casing (5) by means of a mechanical joint and joining the vertical wall (59, 59') to one of the two bodies (45, 45') of the first piece (43) by means of a chemical bond; and
 c) mounting each of the pieces (65, 65') of the second pair by joining the horizontal wall (67, 67') to the casing (5) by means of a mechanical joint and joining the vertical wall (69, 69') to one of the two bodies (45, 45') of the first piece (43) by installing bushings (71, 71') in the drilled holes (48, 48') of lugs (47, 47') used for receiving a bolt joining the vertical stabiliser to the first piece (43).

\* \* \* \* \*